United States Patent [19]

Sumi

[11] Patent Number: 4,644,469
[45] Date of Patent: Feb. 17, 1987

[54] ADDRESSING SYSTEM FOR ELECTRONIC COMPUTER

[75] Inventor: Masahiko Sumi, Chigasaki, Japan

[73] Assignee: Tokyo Shibaura Denki Kabushiki Kaisha, Kawasaki, Japan

[21] Appl. No.: 510,357

[22] Filed: Jul. 1, 1983

[30] Foreign Application Priority Data

Jul. 2, 1982 [JP] Japan .................. 57-115206

[51] Int. Cl.$^4$ ............................................. G06F 13/00
[52] U.S. Cl. ...................................... 364/200; 364/900
[58] Field of Search ... 364/200 MS File, 900 MS File

[56] References Cited

U.S. PATENT DOCUMENTS

| | | | |
|---|---|---|---|
| 3,742,456 | 6/1973 | McFiggans et al. | 364/200 |
| 3,962,682 | 6/1976 | Bennett | 364/200 |
| 4,194,243 | 3/1980 | Tsuda | 364/200 |
| 4,298,928 | 11/1981 | Etoh et al. | 364/200 |

*Primary Examiner*—Gareth D. Shaw
*Assistant Examiner*—Christina M. Eakman
*Attorney, Agent, or Firm*—Schwartz, Jeffery, Schwaab, Mack, Blumenthal & Evans

[57] ABSTRACT

When a CPU accesses a memory device, the upper address data of an address signal is transmitted as parallel signals while the upper address data thereof is transmitted as serial signals after parallel-serial conversion. In order to convert the upper address into the serial signals, a parallel-serial converter is disposed on the side of the CPU or on the side of the CPU of an address bus while a serial-parallel converter is disposed on the side of a memory device or on the side of the memory device of an address bus. The signal lines of the address bus can be decreased in number.

1 Claim, 4 Drawing Figures

ADDRESSING SYSTEM FOR ELECTRONIC COMPUTER

BACKGROUND OF THE INVENTION

The present invention relates to electronic computers and other control equipment and more particularly to a device used for controlling an address bus.

The recent improvements in semiconductor integrated circuit techniques not only make microprocessors and peripheral LSI circuits compact in size and light in weight but also improves the performance of microcomputers and increases considerably the address space. The number of address signal lines for transmitting address data is also increased with an increase in the address space. The reason is that since in a microcomputer various internal data are parallel-processed, one bus (signal line) is required for each bit. Therefore with increase in the address space, address buses consisting of 16, 24 and 32 signal lines are required. Therefore even when integrated circuits which essentially control the performance of microcomputers are made compact in size and light in weight and even when the number of ICs and LSIs used is decreased, the number of address buses, connectors and ICs for driving buses is increased. As a result, the overall systems cannot be made compact in size and light in weight.

In a prior art circuit, a CPU and a memory device are interconnected with 16 address buses which serve as parallel signal lines and a set of 16 lines is connected to a latch circuit in the memory device. However, each buffer in the CPU needs to drive extra lines so that a large output capacity is needed. As a result, a buffer circuit in a chip must be increased in size and consequently the CPULSI remains large in size.

SUMMARY OF THE INVENTION

The present invention was made to substantially overcome the above and other problems encountered in the prior art systems and has for its object to provide an address system for electronic computers which can prevent address buses from becoming greater in number even when the address space is increased.

The present inventor found out the fact that the upper address data of the address signals will not change so often and the present invention is based upon this fact. To the above and other ends, the present invention therefore provides an address system for an electronic computer in which at least one pair of parallel-serial converter and serial-parallel converter is provided for handling the upper data of an address signal, whereby the upper address data is converted into a serial data which in turn is transmitted through a single address signal, whereby the number of signal lines in an address bus can be reduced to a minimum.

The above and other objects, effects and features of the present invention will become more apparent from the following description of preferred embodiments thereof taken in conjunction with the accompanying drawings.

BRIEF DESCRIPTION OF THE DRAWINGS

Same reference numerals are used to designate similar parts throughout figures.

DETAILED DESCRIPTION OF THE INVENTION

Referring to the accompanying drawings, the preferred embodiments of the present invention will be described in detail.

Figure 1:
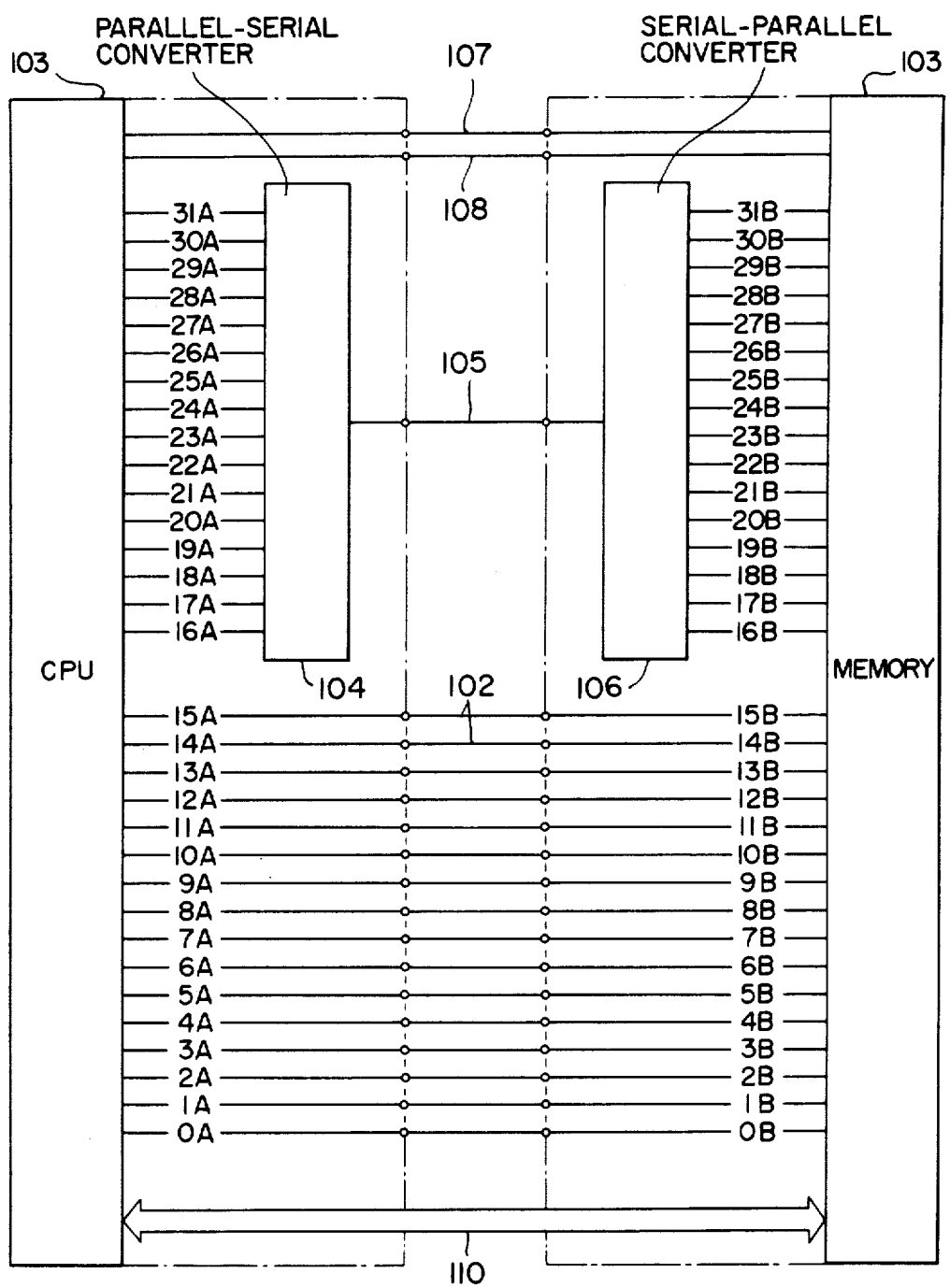
FIG. 1 is a block diagram of a first embodiment of the present invention.

In FIG. 1 is shown a first embodiment of the present invention in which a CPU 101 and a memory 103 are interconnected with address buses 102 and 105, data bus 110, strobe signal line 107 and shift strobe signal line 108. The lower address signal is transmitted through the address bus 102 while the higher address signal, through the address bus 105. That is, the upper address signal which is a serial signal is transmitted through the address bus 105 consisting of a single signal line. To this end, a parallel-serial converter 104 is provided on the side of the CPU 101 while a serial-parallel converter 106, on the side of the memory 103; namely, the upper bits (16A-31A) of CPU 101 are connected to the input terminals of the parallel-serial converter 104 and the output terminal of the converter 104 is connected through the address bus 105 to the serial-parallel converter 106 whose output terminals are connected to the upper address of the memory 103. These converters 104 and 106 may be considered as being included in the CPU 101 and the memory 103, respectively. They are therefore indicated by dot and dash lines. In the first embodiment, the upper and lower addresses each consist of 16 bits, but it is to be understood that any other suitable combinations may be employed. Furthermore, the data bus 110 and the address bus 102 may be a common bus.

16 bits (0A-15A) of the lower address are outputted in parallel from the CPU (central process unit) 101 and transmitted on 16 lower address signal lines 102 to the memory 103 (0B-15B). This arrangement is well known in the art. However, 16 bits (16A-31A) of the upper address are subjected to the parallel-serial conversion by the parallel-serial converter 104 when outputted from the CPU 101; that is, the upper address data is converted into a serial data which is transmitted on a single upper address signal line 105 to the memory 103. The serial data received by the memory 103 is converted by the serial-parallel converter 106 into 16 bits (16B-31B) of the upper address data so as to access the memory 103. The strobe signal line 107 is used to transmit the strobe signal which represents the validity of the serial data to be applied to the serial-parallel converter 106 through the upper address signal line 105. The strobe signal line 107 is of the conventional type. The shift strobe signal line 108 is used to transmit the shift strobe signal which represents the validity of the address data which is transmitted one bit by one bit and serially through the upper address signal line 105. The shift strobe signal line 108 may be therefore eliminated in the first embodiment. That is, if a circuit for detecting or measuring the timing of serially transmitted bits of the address data is provided, the shift strobe signal line 108 can be eliminated.

Figure 2:
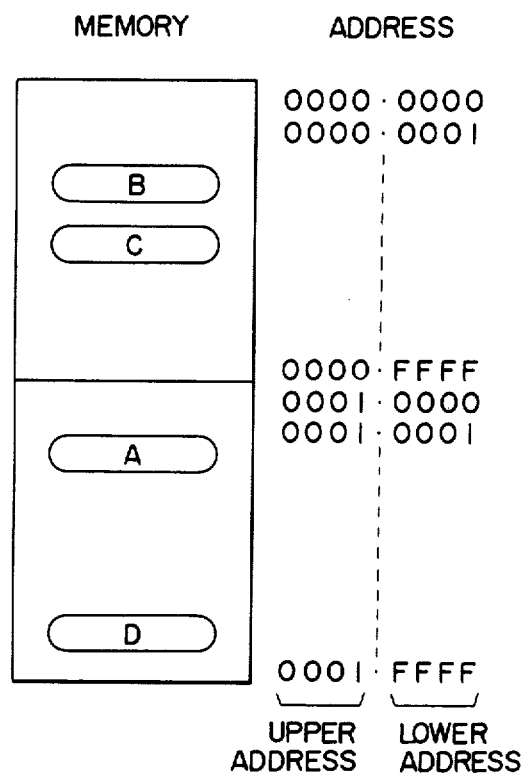
FIG. 2 is a view used to explain areas to be accessed in a memory device, the addresses being designated by hexadecimal numbers.

Next referring further to FIGS. 2 and 3, the mode of operation of the first embodiment will be described in detail. It is assumed (a) that the CPU 101 sequentially access the memories in the areas A, B, C and D in the memory device 103, (b) that, as shown in FIG. 2, in the areas A and D, the upper addresses are the same while the lower addresses are different, (c) that, as shown also in FIG. 2, in the areas B and C, the upper addresses are same while the lower addresses are different and (d) that the upper and lower addresses in the areas A and D are different from those in the areas B and C.

Figure 3:
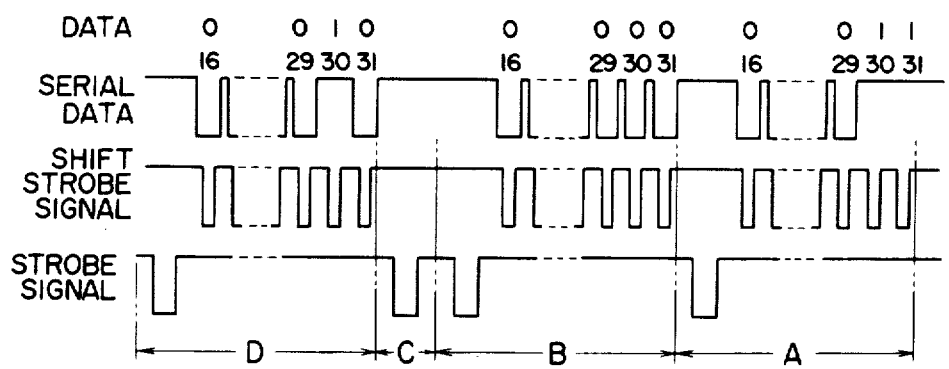
FIG. 3 is a timing chart used to explain the mode of operation of the first embodiment as shown in FIG. 1.

If the area A is accessed, the upper address is converted by the parallel-serial converter 104 into the serial data and is transmitted serially from the most significant bit as shown in FIG. 3. The shift strobe signal is transmitted in one-to-one correspondence relationship with each bit of the serial data so as to attain the synchronization between the shift strobe signal and each bit of the serial data. When 16 bits have been transmitted, the strobe signal is transmitted so as to synchronize the address.

If the area B is accessed, the upper address data is different from the upper address data obtained when the area A is accessed. Therefore, the upper address data is converted into the serial data which in turn is serially transmitted from the most significant bit.

If the area C is accessed, the upper address data is the same as the upper address data obtained when the area B is accessed. Therefore, the upper address data is not transmitted, but only the strobe signal is transmitted so as to synchronize the address.

If the area D is accessed, the upper address is different from the upper address derived when the areas B and C are accessed. Therefore the upper address data is converted into the serial data which in turn is serially transmitted from the most significant bit in a manner substantially similar to that described above.

According to the first embodiment, when the address data consisting of 32 bits is transmitted, the address bus consisting of 32 signal lines can be reduced to the address bus consisting of 17 address signal lines and one shift strobe line. Moreover the address space of 64 K bits can be designated by the lower address consisting of 16 bits so that in most cases the memory can be accessed only with the lower address. That is, the change in the upper address occurs less so that the delay in accessing the memory due to the serial transmission of the serial data can be reduced to a minimum.

In the first embodiment, the serial-parallel converter 106 has been described as being disposed adjacent to the memory device 103, but it is to be understood that it may be disposed immediately outside of the CPU 101. In the latter case, the number of signal lines of the address bus cannot be reduced, but there arises an advantage that the number of pins of the CPU 101 can be reduced.

In the first embodiment, only one parallel-serial converter 104, only one upper address bus 105 and only one serial-parallel converter 106 are provided, but it is to be understood that two converters 104, two address buses 105 and two converters 106 may be provided. In the latter case, time losses resulting from the transmission of the serial data can be minimized.

Next referring to FIG. 4, another or second embodiment of the present invention with a selection circuit will be described. The mode of operation of the second embodiment will be described in conjunction with the address data consisting of 16 bits, but it is to be understood that the present invention is not limited to the address data consisting of 16 bits.

In the second embodiment, 8 bits (0A-7A) are transmitted from the CPU 101 through 8 address buses 102 to the memory device 103 as with the conventional system. However, the upper address data; that is, 8 bits (8A-15A) of the upper address, is converted by the parallel-serial converter 104 into a serial data which in turn is transmitted on a single upper address signal line 105 to the memory device 103. The serial data applied to the memory device 103 is converted into the upper address data consisting of 8 bits by either of serial-parallel converters 106a and 106b. The output lines from the two serial-parallel converters 106a and 106b are combined so that the upper address data consisting of 8 bits (8B-15B) is used to access a memory.

A selection circuit 109 is provided within the CPU 101 so as to store the serial data inputted to the serial-parallel converters 106a and 106b and compares it with a serial data derived from the parallel-serial converter 104 so that if the two serial data are same, a select signal is applied to the serial-parallel converter 106a or 106b. If the two serial data are not identical, the serial data stored in the selection circuit 109 is replaced with the previously outputted serial data. The arrangement and mode of operation of the strobe signal line 107 and the shift strobe signal line 108 are substantially similar to those described with reference to the first embodiment.

Next, referring to the following Table, the mode of operation of the second embodiment will be described in detail.

TABLE

| | | | | | | | |
|---|---|---|---|---|---|---|---|
| 104 address | A | A | B | C | B | C | D |
| 106a address | / | A | A | C | C | C | C |
| 106b address | / | / | / | B | B | B | D |
| serial transmission | a serial | / | b serial | a serial | / | / | b serial |
| select signal | / | a select | / | / | b select | b select | / |

It is assumed that the areas as shown in FIG. 2 are accessed in the order of A, A, B, C, B, C and D. Then the select signals are generated as shown in the Table. "104 address" represents the upper address being applied to the parallel-serial converter 104; "106a address" represents the upper address data being outputted from the serial-parallel converter 106a; "106b address" represents the upper address data being outputted from the serial-parallel converter 106b; "a select" or "b select" means that a select signal is being inputted to the serial-parallel converter; and "a serial" or "b serial" means that the serial data is being transmitted to the serial-parallel converter 106a or 106b.

When the area A is successively accessed or when areas B and C are also accessed after these areas B and C have been accessed, no serial data is transmitted, but the address of a memory can be designated in response to the select signal transmitted. Therefore a time required for the transmission of the serial data will not be increased. As a result, even when the number of signal lines of the bus is reduced from 17 to 12, the time loss due to the serial transmission is almost negligible. Especially in the case of a microcomputer, one address is successively or repeatedly accessed, greater advantages can be attained.

Figure 4:
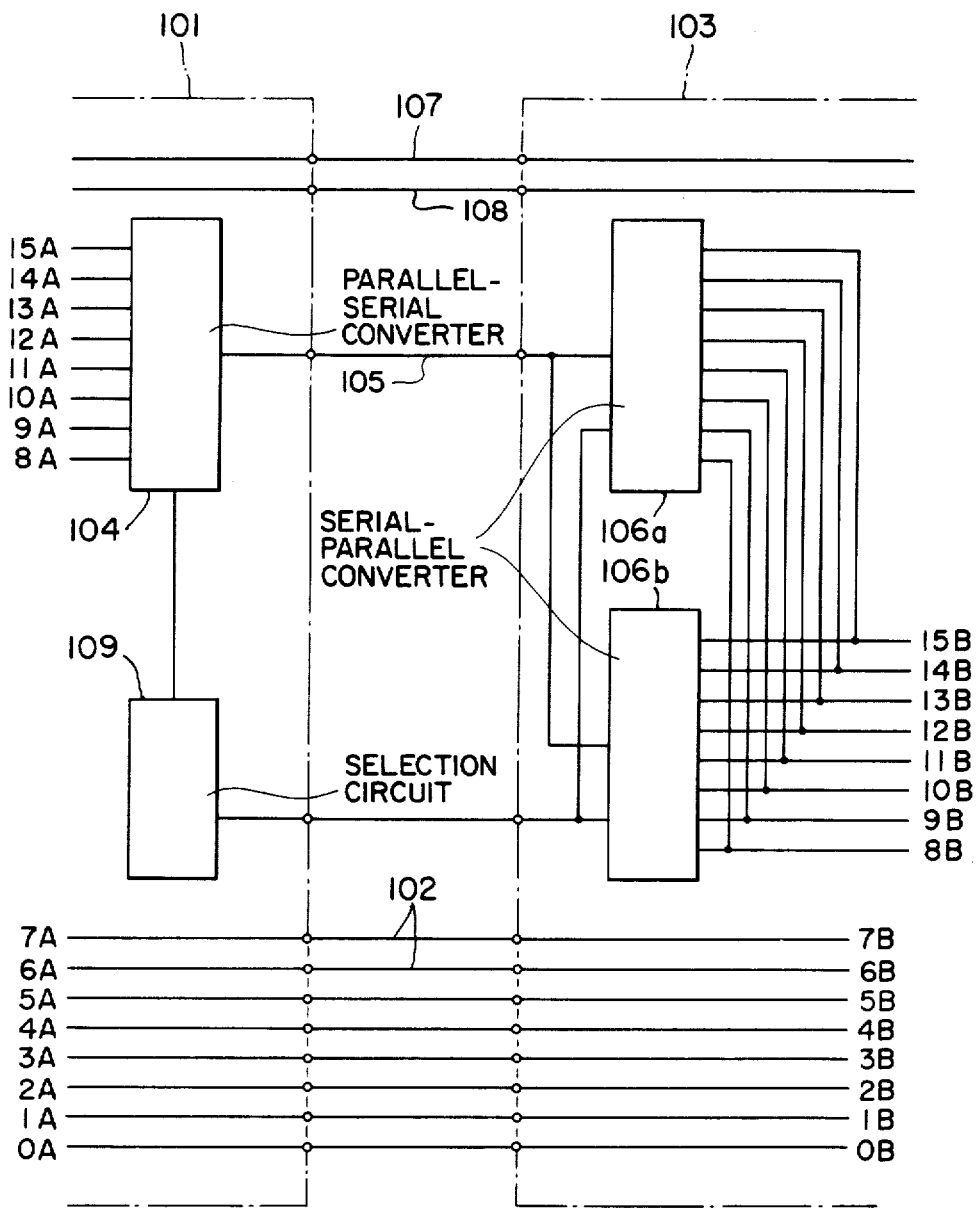
FIG. 4 is a block diagram of a second embodiment in accordance with the present invention provided with a selection circuit.

So far the second embodiment as shown in FIG. 4 has been described as having two serial-parallel converters 106a and 106b, but it is to be understood that more than three serial-parallel converters may be provided.

As described above, according to the present invention, the upper address data is converted by a parallel-serial converter into a serial data which in turn is transmitted to a memory device so that the number of signal lines of a bus may be considerably reduced.

When the upper address data changes frequently, a plurality of serial-parallel converters may be provided on the side of the memory device and a selection circuit is provided to select one of them. Therefore the signal lines in a bus can be considerably reduced in number without increasing a time required for the serial transmission.

What is claimed is:

1. An addressing system in which an address having upper and lower address bits is transmitted from memory accessing means to memory means comprising:

address bus means for outputting said lower address bits of said address as parallel signals and upper address bits of said address as serial signals;

a parallel-serial converter connected to said memory accessing means and through which the upper address bits of said address transmitted from said memory accessing means are converted into said serial signals;

at least two serial-parallel converters connected to said address bus for receiving said upper address bits as serial signal inputs thereto, each of said converters converting said series signals to parallel signals at outputs thereof;

means for connecting said parallel signals from said outputs of each of said serial-parallel converters to said memory means; and a selection circuit for storing current serial signals inputted into said serial-parallel converters and for comparing stored serial signals with current serial signals outputted from said parallel-serial converter means, said selection circuit means transmitting a selection signal to one of said serial-parallel converts to which the serial signals identical with those outputted from said parallel-serial converter means is inputted.

* * * * *